United States Patent
Mestha et al.

(10) Patent No.: US 8,294,948 B2
(45) Date of Patent: Oct. 23, 2012

(54) IMAGE-BASED COLOR PRINTER FRACTAL GAMUT EXTENSIONS ACHIEVED WITH PROCESS SET POINT ADJUSTMENT

(75) Inventors: Lalit Keshav Mestha, Fairport, NY (US); Palghat Ramesh, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1184 days.

(21) Appl. No.: 12/127,705

(22) Filed: May 27, 2008

(65) Prior Publication Data
US 2008/0291480 A1 Nov. 27, 2008

Related U.S. Application Data

(63) Continuation-in-part of application No. 11/099,589, filed on Apr. 6, 2005.

(51) Int. Cl.
*G06F 15/00* (2006.01)
(52) U.S. Cl. ............ 358/1.9; 358/501; 358/518
(58) Field of Classification Search ............ 358/1.1, 358/1.9, 500, 501, 509, 515, 518, 400, 401, 358/475, 296, 300
See application file for complete search history.

(56) References Cited

U.S. PATENT DOCUMENTS

| | | | |
|---|---|---|---|
| 5,719,613 A * | 2/1998 | Fukui et al. | 347/132 |
| 5,749,021 A | 5/1998 | Mestha et al. | |
| 5,754,918 A | 5/1998 | Mestha et al. | |
| 5,950,040 A | 9/1999 | Mestha et al. | |
| 5,987,168 A | 11/1999 | Decker et al. | |
| 6,018,636 A | 1/2000 | Caruthers | |
| 6,344,902 B1 | 2/2002 | Duke et al. | |
| 6,525,721 B1 | 2/2003 | Thomas et al. | |
| 6,636,708 B2 | 10/2003 | Takahashi | |
| 6,744,531 B1 | 6/2004 | Mestha et al. | |
| 7,088,469 B1 * | 8/2006 | Sanger et al. | 358/1.9 |
| 7,110,143 B2 | 9/2006 | Bares et al. | |
| 7,450,281 B2 | 11/2008 | Torigoe et al. | |
| 7,466,446 B2 | 12/2008 | Arakawa | |
| 7,528,989 B2 | 5/2009 | Nishide et al. | |
| 2002/0008880 A1 | 1/2002 | Dewitte et al. | |
| 2002/0163570 A1 | 11/2002 | Phillips | |

(Continued)

FOREIGN PATENT DOCUMENTS

EP 1 292 102 A2 3/2003

(Continued)

OTHER PUBLICATIONS

Sohail A. Dianat et al., Dynamic Optimization Algorithm for Generating Inverse Printer Maps with Reduced Measurements; Accepted for publication 2006 IEEE International Conference on Acoustics, Speech and Signal Processing. Toulouse, France, May 14-19, 2006.

(Continued)

*Primary Examiner* — Thomas D Lee
(74) *Attorney, Agent, or Firm* — Fay Sharpe LLP (57) ABSTRACT

A color management system is provided for enabling imaging of selected colors called spot colors by dynamically adjusting the normal printer gamut to achieve a color gamut extension. Developed toner mass may be increased or decreased by changing ROS laser intensity. Such adjustment can occur on a pixel-by-pixel basis for within page and within sections of the image gamut extension.

13 Claims, 5 Drawing Sheets

U.S. PATENT DOCUMENTS

| | | |
|---|---|---|
| 2005/0030560 A1 | 2/2005 | Maltz et al. |
| 2006/0227395 A1 | 10/2006 | Mestha et al. |
| 2007/0002342 A1 | 1/2007 | Morales et al. |
| 2007/0098430 A1 | 5/2007 | Hoffman et al. |
| 2008/0291479 A1 | 11/2008 | Mestha et al. |

FOREIGN PATENT DOCUMENTS

| | | |
|---|---|---|
| JP | 2002-112057 | 4/2002 |

OTHER PUBLICATIONS

Eli Saber, Sohail Dianat, Lalit K. Mestha, Perry Y. Li; "DSP Utilization in Digital Color Printing", IEEE Signal Processing Magazine, Jul. 2005 pp. 1-7.

Peer A. Dilling, "Levels of Process Automation in an Offset Press", Proceedings of IS&T's NIP20: 2004 International Conference on Digital Printing Technologies, Oct. 31-Nov. 5, 2004.

* cited by examiner

IMAGE-BASED COLOR PRINTER FRACTAL GAMUT EXTENSIONS ACHIEVED WITH PROCESS SET POINT ADJUSTMENT

CROSS REFERENCE TO RELATED PATENTS AND APPLICATIONS

This continuation-in-part application claims the priority benefit of U.S. application Ser. No. 11/099,589, filed Apr. 6, 2005, the disclosure of which is incorporated herein by reference.

TECHNICAL FIELD

The disclosed embodiments generally relate to methods and systems for printer color management in image/text printing or display systems. The embodiments are directed to processes for generating improved spot color accuracy, by varying process set points for extending color gamuts and achieving extended or more variant gamut colors comprising desired spot colors.

BACKGROUND

To meet customer demand, the commercial printing industry requires the capability of producing spot colors accurately and consistently. Spot colors can be defined as a fixed set of colors which may be Pantone® colors, customer logo colors, colors in a customer's proprietary marked patterns, or customer defined colors in the form of an index color table. Spot colors are often used, or can be used, for large background areas, which may be the most color critical portion of a particular page. Consistent color in these areas may determine the difference between success and failure in meeting customer requirements. Customer demands for color accuracy and consistency are typically much tighter for spot colors than for colors within images.

The color gamut of a printer is a multi-dimensional space of a given volume with the axes of the space being set or defined initially by the pigments used in the colorants of the primary colors such as, for example, cyan, magenta, yellow, and black. In forming multi-color output images on an image-receiving medium, each of the primary colors is transferred to the image-receiving medium in turn. The color gamut is defined by the interaction of the primary colors, and is limited by a total amount of toner in any combination that can be effectively deposited on the image-receiving medium. For each system, the toner deposited on the image-receiving medium, such as a photoreceptor, is referred to as DMA (Developed Mass per unit Area). Otherwise, toner transfer to the image-receiving medium will be affected, and the quality of the produced images will be reduced.

In Image-on-Image printers, the actual available color gamut for a particular image forming device not only depends on colorants of the pigments but it is also a function of DMA. The DMA depends on the set points for certain process parameters of each of the separations. The process parameters are, for example, photoreceptor voltages (charged and/or discharged voltages), donor and/or magnetic roll voltages, toner concentrations and the like.

Combinations of set points affect DMA levels thereby defining limits to the color gamut by limiting the developed color combinations that are available from specific mass levels of each of the primary colorants. These set points are developed in sets, the sets of set points and associated color rendition dictionary (CRD) by which images may be produced by the image forming device. CRDs, and their associated set points, are generally experimentally derived for a given image forming device or system. CRDs are appropriately nominalized in order that the CRD and associated set of set points programmed into an image forming device, or family of image forming devices, substantially ensures that the color gamut produced by that image forming device covers, as broadly as possible, an available nominal color spectrum. Typically then, image forming devices are delivered with a single CRD available in the image production system which is defined by the associated set points adjusted in order to center the color gamut. Such a color gamut is referenced herein as the "normal" color gamut.

Occasionally, customers or other end-users of an individual image forming device, or family of image forming devices, may desire to produce and/or reproduce, on a recurring basis, a color or set of colors that lies outside the nominal color gamut available based on the single CRD that comes pre-stored in the image forming device, i.e. the memory or spot colors. CRDs and individual process parameter set points are not, however, user adjustable. Where a user is provided access to a capability in an image forming device to adjust individual set points, predetermined CRDs would be rendered invalid. A likely outcome would be that the color gamuts available to produce output images would be adversely affected.

Producers and suppliers of image forming devices have a capability to experimentally bias and/or skew the color gamut available in their products. Through experimentation, a new CRD may be defined based on a modified set of set points to adjust the color gamut of an image forming device. In such a case, the total volume of the color gamut available from the image forming device is not increased, but it is shifted or skewed. The library of available colors, however, is modified in order that a different or more vibrant single color-based output set of hues (e.g., vibrant red or vibrant blue) may be made available at the expense of potentially available pallets of other hues, (e.g., green and blue hues) to be produced and/or reproduced within the skewed color gamut defined by this modified color rendition dictionary. Using such a skewed gamut at multiple sets of set points, effective color gamut is increased or extended beyond the nominal gamut.

There is a need for spot color printing with such non-standard gamuts achievable by adjustment of the previous set points when such a spot color is beyond the normal color gamut of the printer as set by the primary color pigment colorants, e.g., cyan, magenta, yellow and black.

It would be advantageous to provide a capability within an image forming device, or family of image forming devices, to adjust the color gamut to encompass a desired spot color by gamut extension on a pixel-by-pixel basis. Such a fractal gamut extension would allow intra page color extensions for improved printer color enhancement and variation. Unfortunately, adjustment of certain printer process parameter set points do not give within page gamut extensions since the changes to mag roll (development roll) bias of process or spot color separations can change the developability of the whole page at a time.

There is thus a need for a method to achieve the extended gamut colors on a pixel-by-pixel for within page fractal gamut extensions and then running the color control and process control loops in a non-standard print mode to achieve the desired extensions.

SUMMARY

A method is provided for adjusting a color printer gamut of a printer to encompass a selected spot color wherein the selected spot color is outside of a nominal printer gamut by using distributed actuators in the ROS (Raster Output Scanner); such as ROS intensity to provide the fractal gamut extensions for those pixels which require the extensions. The printer first operates in a nominal printer gamut associated with a nominal set of process parameter set points. When a selected spot color is identified as out of the nominal printer gamut, the process parameter set points are adjusted by changing laser intensity of the Raster Output Scanner (ROS) to vary a toner mass comprising a selected spot color. The process parameter set points are returned to the nominal set of color printing of pixels for other than the selected spot color.

In accordance with another embodiment, a printer control system for effecting image based fractal gamut extensions is provided by selective adjustment of a Raster Output Scanner system. A charging and exposure system imposes a latent image on a photoreceptor. A fractal gamut processor associated with the charging and exposure system adjusts laser intensity of the ROS whereby toner mass is varied to achieve selected spot color outside of the nominal printer gamut. The fractal gamut processor selectively adjusts the laser intensity on a pixel-by-pixel basis for within page gamut extension.

In accordance with yet another embodiment, in a printer system comprised of multiple engines, a fractal gamut extension is effected on a second engine by selectively adjusting a Raster Output Scanner system of the second engine. A charging and exposure system imposes a latent image on a photoreceptor of the second engine. A fractal gamut processor associated with the charging and exposure system adjusts laser intensity of the ROS of the second printer whereby toner mass is varied to achieve selected spot color outside of the nominal printer gamut of the second printer. The fractal gamut processor selectively adjusts the laser intensity on a pixel-by-pixel basis for within page gamut extension so as to match the same spot color produced on other engines of the first print system.

DETAILED DESCRIPTION

The following description of various exemplary embodiments of systems and methods for color gamut skewing within an image forming device may refer to one specific type of image forming device, such as an Image-on-Image (IOI) printer, for the sake of clarity, familiarity and ease of description. However, it should be appreciated that the disclosed principles may be equally applied to any image forming device that is usable to produce and/or reproduce color images particularly as hard-copy output images on an image-receiving medium. Such devices may include, but are not limited to, copiers, printers, scanners, facsimile machines, xerographic image forming devices, and/or any other now known or later-developed system or device for producing, reproducing and/or potentially transmitting or receiving color images.

Figure 1:
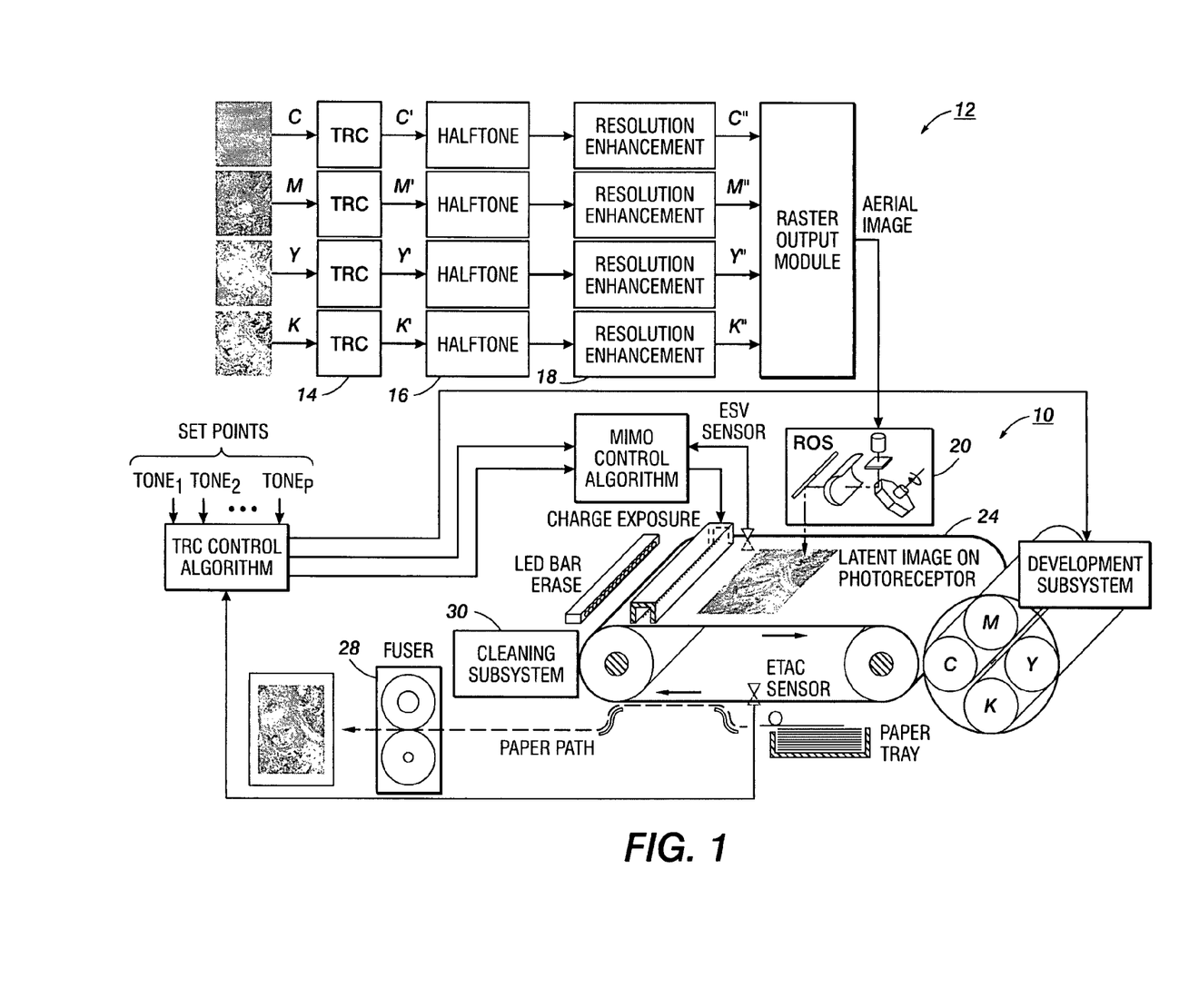
FIG. 1 is a schematic diagram of a marking engine/printer.

With reference to FIG. 1, print engine 10 includes, a DFE (digital front end) 12 or a network of DFEs from multiple vendors to convert the electronic "master" documents (through a series of signal processing applications such as segmentation, rasterization, color management, image enhancement, and anti-aliasing) from their device-independent form to a format that is specifically designed and optimized for the intended printing system. To this effect, the input document is transformed from its PDL (page description language) format (such as PS) ("Post Script") to cyan (C), magenta (M), yellow (Y), and black (K) color separations to be printed by the engine. This is done by first utilizing an interpreter (e.g., PS interpreter) to identify the commands found in the PDL. An imaging module then generates a rasterized format of the PDL document at the correct print engine resolution (e.g., 600 dots/in). The above is usually referred to as raster image processing (RIP). During the RIP, color rendering dictionaries (CRDs), optimized a priori for the engine at hand, are employed by the color management module to transform the color from RGB or L*a*b* formats to CMYK separations. Some DFEs employ object-oriented rendering (OOR) algorithms intended to enhance the color reproduction by utilizing custom CRDs for specific image objects (such as a "skin" CRD for fleshtone or a "sky" CRD for blue skies). For OOR to be effective, segmentation algorithms must be utilized to identify the objects of interest. Once the RIP is complete, the input job is transformed from a PDL format to CMYK separations ready for engine consumption. The separations are usually generated at the engine resolution (e.g., 600 dpi) for a given paper size (e.g., 8.5×11 in), where each separation is made up of 8b/pixel.

The print engine, also referred to as the "marking engine," is designed to convert the electronic CMYK media provided by the DFE into hardcopy color prints. FIG. 1 illustrates a typical digital press or printing system based on the principles of electrophotography (EP). Invented by Chester Carlson in 1938, EP is utilized today as a key technology for high-volume digital color printing. The CMYK digital data (typically 8 b/pixel/channel) submitted from the DFE are processed through appropriately designed tone reproduction curves 14, halftoned 16, resolution enhanced 18, and then submitted to the raster output scanner (ROS) 20 for imaging and printing. The digital printing process revolves around a circulating photoreceptor (PR) 24 in the form of a belt or a drum. The photoreceptor is light sensitive, so that it is insulating in the absence of light and conductive in the presence of light.

The first step in the EP process is "charging," where a high-voltage wire deposits electrons or ions on the PR in the dark, causing a uniform charge buildup. The CMYK separations provided by the DFE are then utilized to selectively expose, through the use of raster output scanners (ROS) 20, the charged PR drum 24 or belt according to the binary halftoned image pattern. The resulting spatial charge distribution, called the latent image, corresponds to the desired image to be printed. It is then "developed" by depositing oppositely charged toner particles exclusively in the charged regions, thus forming a toned image on the photoreceptor. The toned image is "transferred" to paper by electrostatic forces and made permanent by "fusing," a process in which heat and pressure are applied to melt the toner particles and adhere them to the paper. Finally, the photoreceptor is "cleansed" mechanically and electrostatically of left-over particles and recirculated to the charging system for the next image, in the finishing (postpress) stage.

Figure 2:
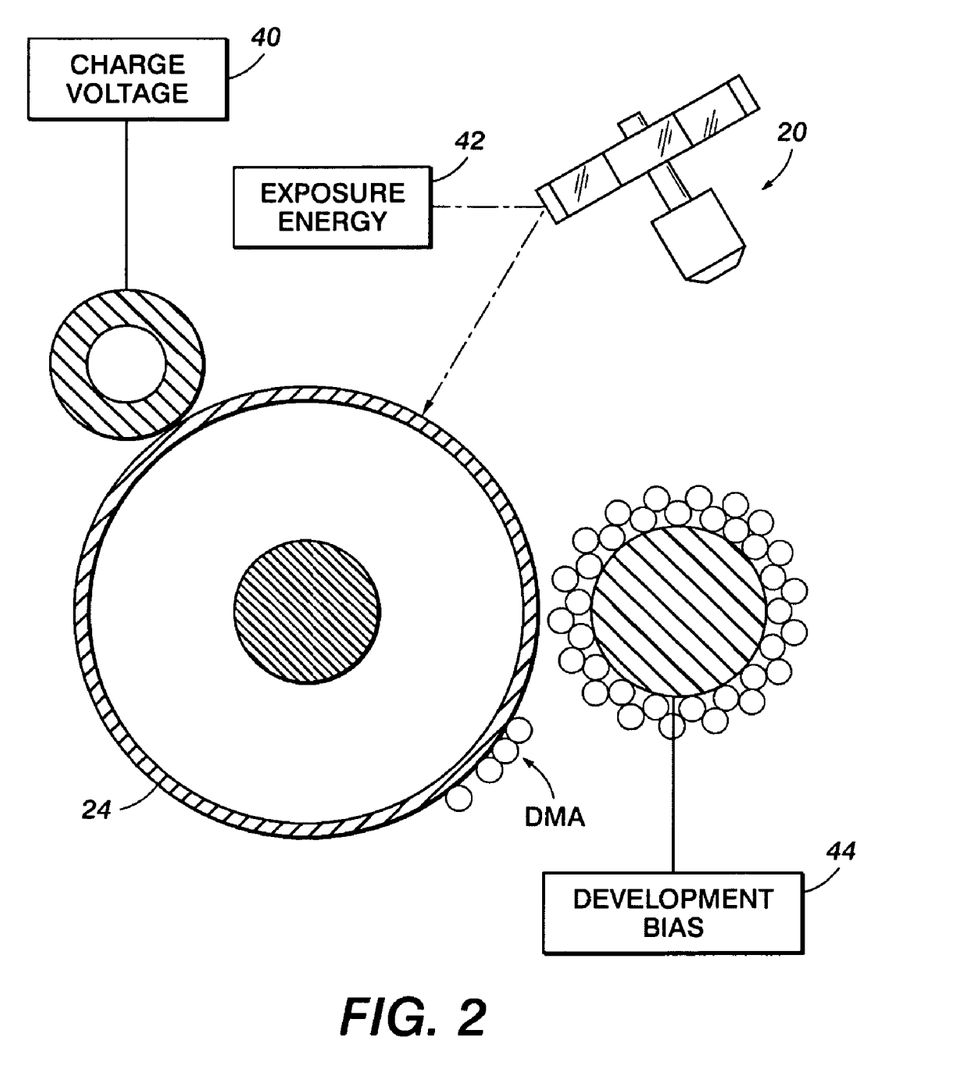
FIG. 2 is a simplified version of FIG. 1 emphasizing the principal elements of the development system affected by process set points.

With reference to FIG. 2, the principal print process parameters that can be adjusted to extend the color gamut of the printer are isolated for simplicity of explanation. As noted above, if the DMA is adjusted, by adjusting process set points, print colors can be generated outside of the nominal printer gamut. FIG. 2 shows three principal process set point parameters which can be adjusted to achieve a gamut extension; a photoreceptor chargeable (or dischargeable) 40, a laser intensity exposure energy 42 and development bias (donor voltage) 44. Process set points for all three parameters can conceivably vary between minimum, nominal and high values to achieve memory or spot colors outside of the normal printer gamut, with the normal gamut corresponding to the nominal parameter values and outside of gamut spot colors corresponding to either minimum or high values of these process actuators. The embodiments are also intended to include sorted combinations of minimum, nominal or high values of the process actuators to further achieve any desired spot color printing capabilities.

Figure 3:
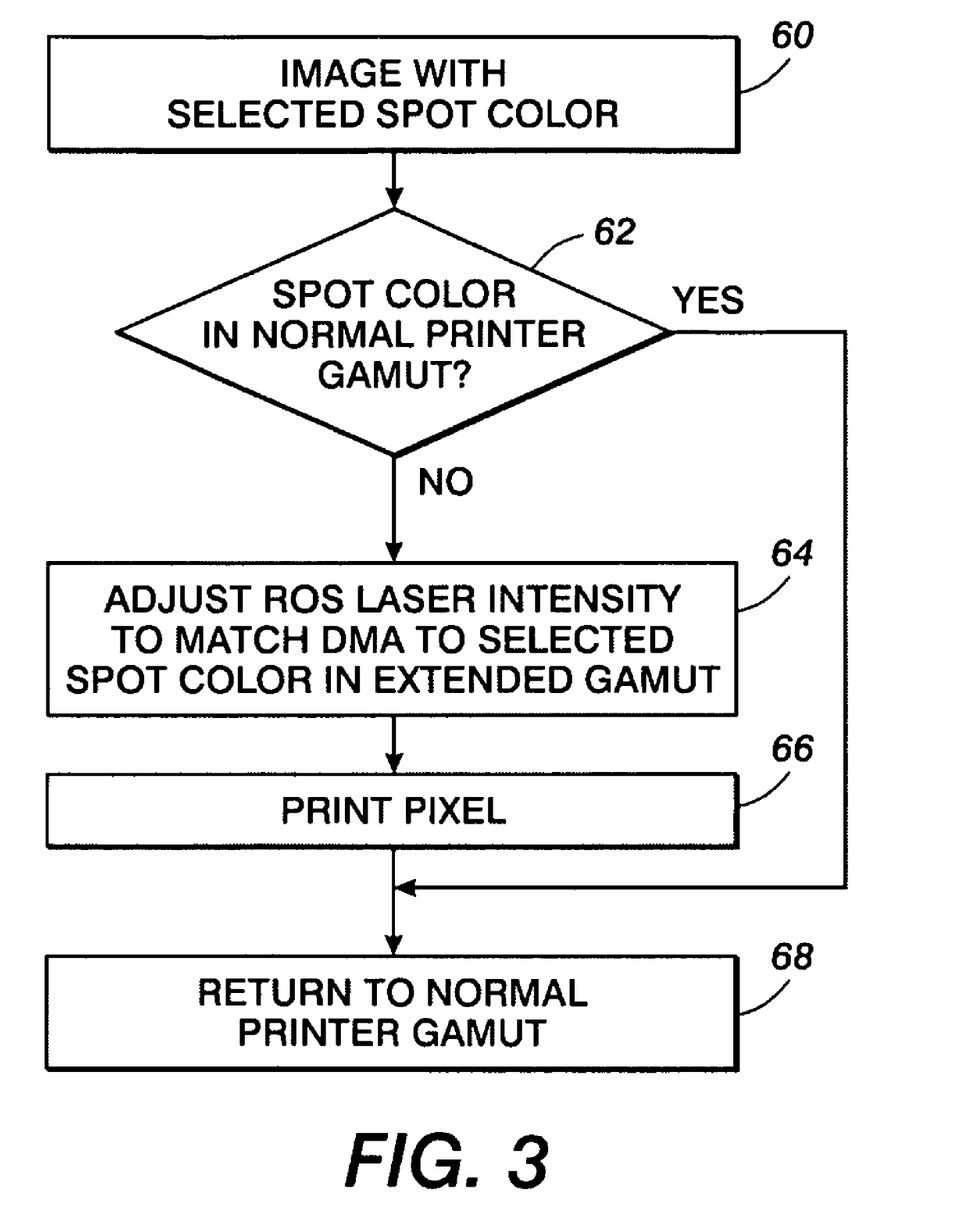
FIG. 3 is a flowchart of a method for printing with non-standard gamuts achieved with process set point adjustment.
Figure 4:
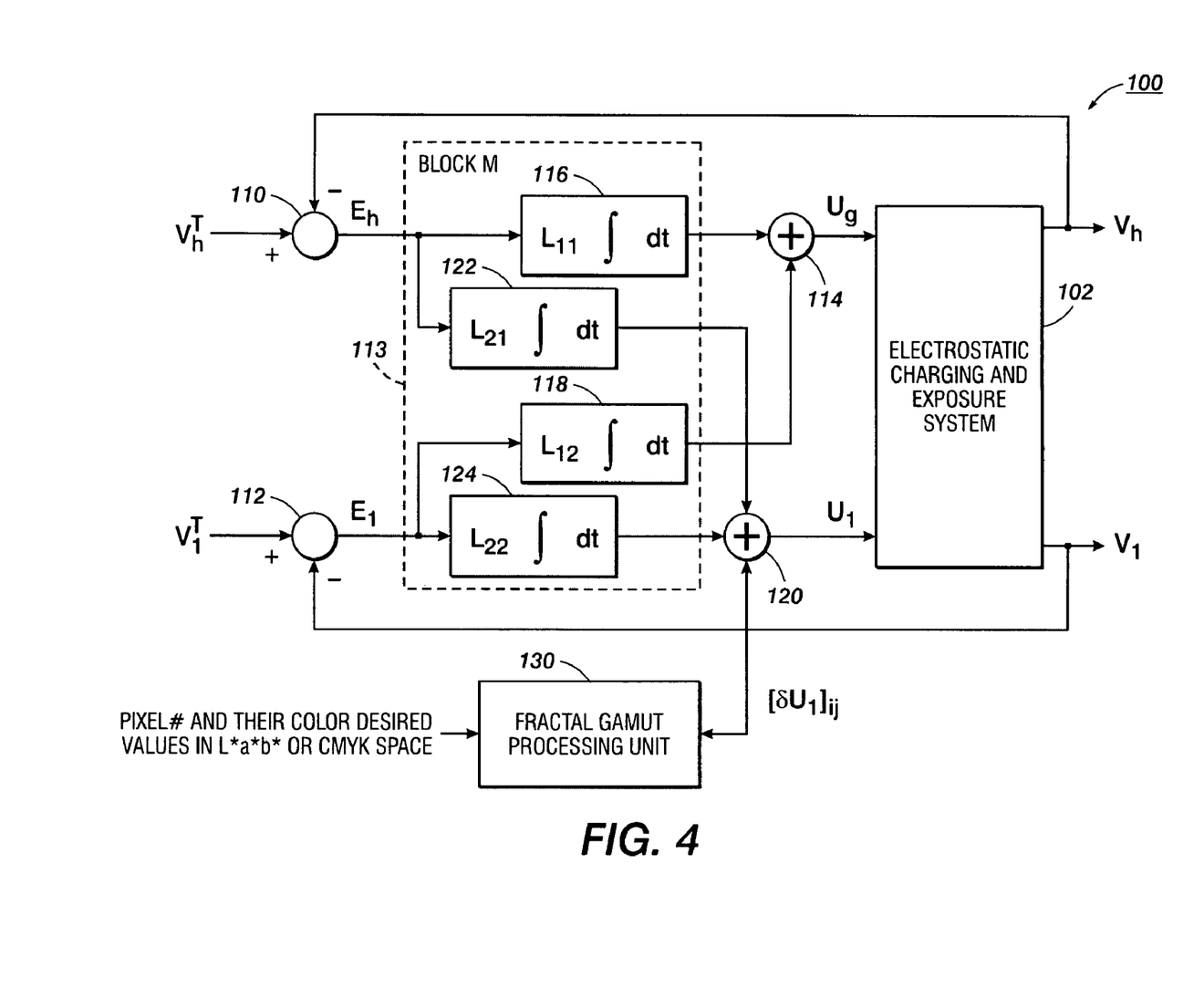
FIG. 4 is a block diagram of an electro static charging and exposure system including a feedback compensator and fractal gamut processing unit.

With reference to FIGS. 3 and 4, an embodiment of a method for adjusting the color printer gamut to encompass a selected spot color outside of the nominal gamut is illustrated. When an image 60 is presented having a spot color outside of the normal printer gamut 62, an adjustment 64 of the ROS laser intensity to match associated pixel DMA to the selected spot color is accomplished by the charging exposure system 100 as adjusted by the fractal gamut processing unit 130. The details of operation of the system of FIG. 4 are more particularly recited in U.S. Pat. No. 5,754,918, herein incorporated reference, but for purposes of brief explanation, the system is comprised of a forward loop compensator 113 or Block M and the electrostatic charging and exposure system 102. Here the grid voltage is generated by summing in node 114 the integration of the errors $E_h$ and $E_l$ with weightings $L_{11}$ and $L_{12}$ blocks 116 and 118 respectively. Similarly, the control signal is generated by summing in node 120 the integral of the errors $E_h$ and $E_l$ with weightings $L_{21}$ and $L_{22}$ blocks 122 and 124 respectively. Correct choice of weightings $L_{11}$, $L_{12}$, $L_{21}$, and $L_{22}$ will enable the overall system to behave properly not only in the presence of noise described above but also when there is strong coupling between inputs and outputs.

Thus, with suitable weighting or adjustment terms or elements as shown in blocks 116, 118, 122, and 124, the control system can respond to generated error signals to compensate for effects on all affected control parameters. Thus, summing node 114 integrates adjustment element or block 116 responding to error $E_h$, and adjustment element or block 118 responding to error $E_l$ to properly correct the charging system. In a similar manner, summing node 120 integrates adjustment element or block 122 responding to error $E_h$ and adjustment element or block 124 responding to error $E_l$ to properly correct the exposure system. Weights can be selected in various ways by applying appropriate linear feedback control theory. This type of control system is called a multiple input multiple output/(MIMO).

Figure 5:
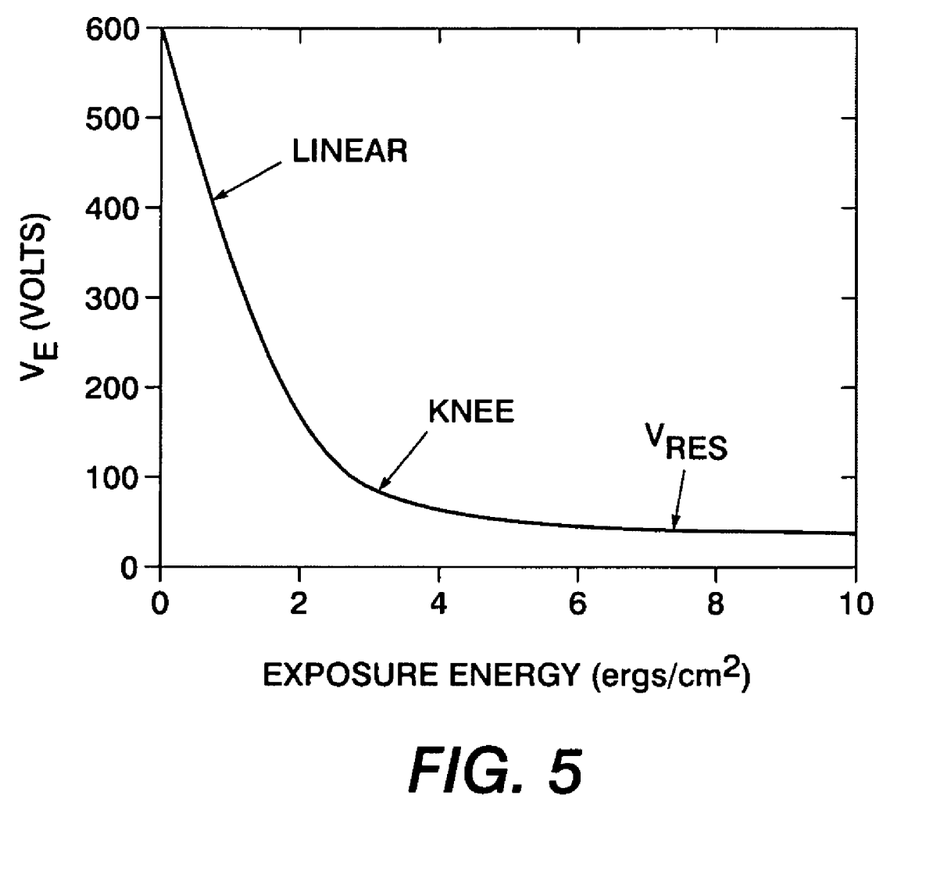
FIG. 5 is a representative of a typical photo-induced discharge curve illustrating image potential on a photoreceptor to a laser exposure level.

An adjustment of ROS intensity is affected by operating the exposure control at or near the linear region of the photo-induced discharge curve (FIG. 5), in addition to the normal charge/exposure control system 100. More particularly, fractal gamut processing unit 130 exploits the linear portion of the photo-induced discharge curve (PIDC) 130. PIDC is the fundamental response of the photoreceptor which relates the image potential on the photoreceptor to the laser exposure level. A typical PIDC is characterized by a linear portion, a knee and a residual voltage ($V_{ers}$) with the photoreceptor discharges to a high exposure level. In many color tandem engines, the level 1 electrostatic controls disclosed in U.S. Pat. No. 5,754,918 is operated in a linear portion of the PIDC. In these systems, the ROS power (intensity) is used to control the solid area mass while a developer roll voltage ($V_{mag}$) is fixed. The mass levels of CMYK solid patches can be changed by adjusting the ROS power. For systems set up at or near the knee of the PIDC, the ROS power provides a mechanism to change the density of the mid tones and high tones. In these systems, ROS intensity can be a powerful actuator for gamut extension.

Electrostatic controls for printers require the accurate adjustment of scorotron or dicorotron grid voltages and the ROS power. The grid voltage is varied to achieve the required uniform charge on the bare photoreceptor. The exposure level is controlled by varying the laser power. An ESV sensor (not shown) is used to measure the amount of charge on the photoreceptor before and after the exposure by creating separate surrogate patches in the inter-document zone, which is normally created between adjacent customer image areas. After the measurement is done, error signals are generated by comparing the ESV sensor readings to the predetermined charge and exposure levels. The exposure and charge levels are sometimes derived from development control loops, which operate at a much reduced frequency with measurement of developed toner mass on patches at multiple area coverages after the patches have gone pass the development system. These loops do not allow abilities to change the color gamuts for any given pixel or a block of pixels within the page in a distributed fashion, by giving the desired exposure level to those pixels. The fractal gamut control loop is proposed to operate with all those control loops in place, and yet create a higher/extended gamut at selective areas of the image.

According to the present embodiment, for each of the input pixels of the image requiring gamut extension, the laser power shown by the symbol, $U_l$, is superimposed with signals from the fractal gamut processing unit. It is important to note that the additional modulation provided by the fractal gamut control unit is disabled when the laser is writing/exposing the level1 control patches. This way, all the additional actuations are used only on the imaging area, exclusively at regions or for pixels where it is most needed.

Let $[\delta U_l]_{ij}$ be the additional laser power modulation required for pixels designated by [ij] above and beyond the laser power generated by the level 1 controller, $U_l$. The symbol [ij] can also mean a block of pixels designated by the coordinates [i,j]. The new laser power is now equal to $[U^e_l]_{ij} = U_l + [\delta U_l]_{ij}$. The desired modulation $[\delta U_l]_{ij}$, is computed by performing offline color experiments which would comprise of building following Look Up Tables.

As an exemplary embodiment, a simple One-Dimensional or a 3-Dimensional Look Up Table is described.

One-Dimensional LUT comprise of following four 1-D LUTs, which can give the extension for much reduced color set.

C->$U_l$(c) for cyan laser system
M->$U_l$(m) for magenta laser system
Y->$U_l$(y) for yellow laser system
K->$U_l$(k) for black laser system To increase the extension for larger number of colors in all directions, a combination of 3-D LUTs and 1D-LUTs may be required.

CMY->[$U_l$(c) $U_l$(m) $U_l$(y)] for CMY laser system

As noted above, when certain customers have requirements to produce logo colors (also called memory colors/highlight colors/pantone colors/spot colors) that a certain printer may be not able to make while operating in a standard/ nominal/normal gamut, the gamut needs to be extended to achieve the customer desired color. Usually the customer must first of all identify the critical color area from the image that needs extension and then runs a color control and process control loops in a nonstandard print mode to achieve the desired extension. When such extension is achieved by using profile LUTs, created a priori during make ready shifts/proofing stage/just before the press run, such an embodiment may not give the desired accuracy and consistency for selected spot colors or other colors since the profile LUTs have finite resolution and adjustments have to be made for the whole page.

The subject embodiments overcome these problems by achieving color gamut extensions within the page by using the image-based ROS intensity control system on a pixel-by-pixel basis. The foregoing control of exposure at or near the linear region of the PDIC allows such fractal gamut extensions to operate effectively merely in combination with the normal charge/exposure control system.

There may be occasions where matching of a particular section of the image containing spot color is required between machines when similar machines are operating in tightly integrated serial printer (TISP) or tightly integrated parallel printer (TIPP) configurations producing prints for high productivity environment. Color gamuts of these printers are not the same when they are operating in the normal or during non-standard print mode, and hence colors of some pixels may reside outside the gamut of one of the printers, and yet be achievable in the other printer. These problems are overcome by using the embodiments described in this invention by achieving color gamut extensions within the page by using the image-based ROS intensity control system on a pixel-by-pixel basis on single or multiple printers.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for adjusting a color printer gamut of a printer to encompass a selected spot color, the method comprising:
   operating by a digital front end the printer in a nominal printer gamut associated with a nominal set of process parameter set points;
   identifying by the digital front end a selected spot color as out of the nominal printer gamut;
   adjusting by a factual gamut processor the process parameter set points by changing laser intensity of a raster output scanner (ROS) to vary a toner mass to match a toner mass of the selected spot color;
   using the ROS to charge a photoreceptor for forming a latent image including the selected spot color; and,
   returning the process parameter set points to the nominal set for color printing of pixels other than the selected spot color.

2. The method of claim 1 wherein the adjusting is fractal per page, on a pixel-by-pixel basis.

3. The method of claim 1 wherein the adjusting includes associated adjusting of development roll bias.

4. The method of claim 1 wherein the adjusting includes limiting the ROS intensity control to a linear portion of photoreceptor photo-induced discharge curve.

5. The method of claim 4 wherein the adjusting includes leaving the level1 charge and exposure control loop undisturbed.

6. The method of claim 1 wherein the printer comprises a plurality of marking engines for integrated parallel or serial printing and the adjusting comprises generating the selected spot color in the plurality of the marking engines.

7. The method of claim 6 wherein a first set of set points in a first engine of the plurality of marking engines to generate the selected spot color is different than a second set of set points to generate the selected spot color in a second engine of the plurality of marking engines.

8. A printer control system for effecting image-based fractal gamut extensions by selective adjustment of a raster output scanner (ROS) system, comprising:
   a charging and exposure system for imposing a latent image on a photoreceptor; and,
   fractal gamut processor for adjusting laser intensity of the ROS whereby toner mass is varied to achieve a selected spot color outside of nominal printer gamut, wherein the fractal gamut processor limits ROS laser intensity control to a linear portion of a photo-induced discharge curve of the photoreceptor.

9. The control system of claim 8 wherein the fractal gamut processor selectively adjusts the laser intensity on a pixel-by-pixel basis for within page gamut extension.

10. The control system of claim 8 further including a development roll and controller for selective adjustment of development roll bias in association with the adjusting of the laser intensity.

11. The control system of claim 8 wherein the fractal gamut processor leaves a printer level 1 charge and exposure control loop undisturbed.

12. The system of claim 8 wherein the printer control system comprises a plurality of marking engines for integrated parallel or serial printing, each marking engine including an associated fractal gamut processor, respectively, for adjusting of laser intensity to generate the selected spot color.

13. The system of claim 12 wherein the adjusted laser intensity of a first marking engine to generate the selected spot color is different than the adjusted laser intensity of a second marking engine to generate the selected spot color.

* * * * *